J. R. Howell,
Water Wheel,
Nº 17,041.      Patented Apr. 14, 1857.

UNITED STATES PATENT OFFICE.

I. R. HOWELL, OF ALEXANDRIA, VIRGINIA.

IMPROVED METHOD OF ATTACHING ADJUSTABLE BUCKETS TO THE SHAFTS OF WATER-WHEELS.

Specification forming part of Letters Patent No. 17,041, dated April 14, 1857.

*To all whom it may concern:*

Be it known that I, I. R. HOWELL, of the city and county of Alexandria and State of Virginia, have invented a new and useful Improvement in the Mode of Attaching and Adjusting the Buckets of Central-Discharge Water-Wheels; and I do hereby declare that the following is a full, clear, and exact description thereof, reference being had to the accompanying drawings, making part of this specification, in which—

Figure 3:
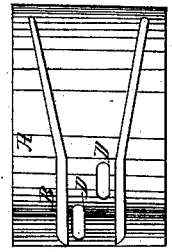
Figure 2:
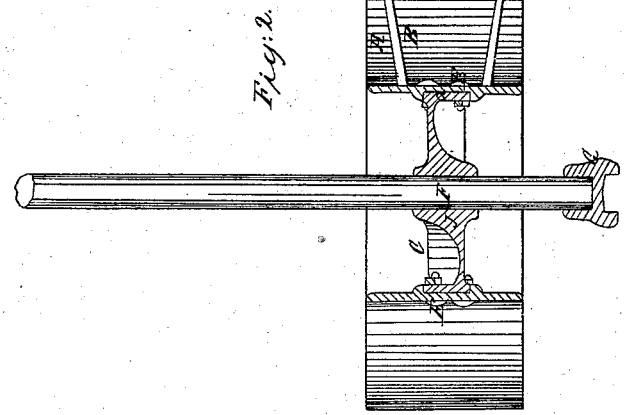
Figure 1:
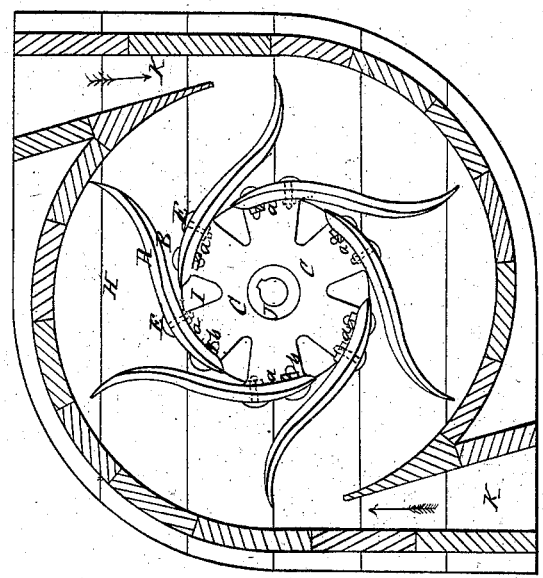

Figure 1 represents a plan of a water-wheel embracing my improvement, the top being removed; Fig. 2, a transverse section of the wheel removed from the trunk, the shaft being in elevation; and Fig. 3, a plan of one of the buckets removed from the wheel, showing the means of effecting the adjustment.

The object of my invention is to provide a cheap, strong, and simple means of effecting the adjustment of the several buckets of the wheel, so that its diameter can be increased or diminished, as circumstances should dictate, whether to increase or diminish the power of the wheel or to enable the wheel to fit the trunk into which it may be placed or to adjust either of the buckets so as to travel in the same circle as the others, the improvement being more especially adapted to that class of wheels having spiraled radiating arms for the purpose of facilitating the discharge of the water; and its nature consists in forming the buckets with slots of an oblong shape, rounded at their ends, instead of a mere bolt-hole, so that they may slide over the bolts when the latter are loosened, either outwardly or inwardly, to increase or diminish the diameter of the wheel, as required, after which they may be securely attached to the arms by means of the bolts over which they slide, or the flanged end of the arms may be formed with slots in the same way to permit the bolts to traverse either outwardly or inwardly for the same purpose; but the former mode is deemed the best, as being the most practicable and simple way.

To enable others skilled in the art to make, construct, and use my invention, I will proceed to describe it in detail.

In the accompanying drawings, H represents a trunk in which the wheel is inclosed and revolves, and F the shaft, to which the latter is secured in any suitable manner, and working in a step G. The arms C radiate from the hub J, and are slightly spiraled and set at any suitable angle to the hub for the facilitating of the discharge of the water. For this purpose the outlet I for the water is made equal to the diameter of the center or spider of the wheel—that is to say, of the arms and hub. The buckets A in this instance are so curved and adjusted to the arms C as that the discharge shall be at right angles to the heel of the buckets, whence it is diverged laterally by the spiraled form of the arms. Upon the inner side of these buckets are formed two beveled ribs or flanges B, that extend their entire length, and so arranged and beveled that their rear ends shall fit over the flanged and counter-beveled end $a$ of the arms C. The outer ends of these ribs flare outward over the buckets, so as to impart to them additional strength and rigidity. Between the ribs B of the buckets at their rear end are formed two or more slots D, of a curved oblong shape, the ends of these slots in this instance being slightly beveled. Through these slots and mortises in the feet or ends $a$ of the arms C are passed screw-bolts E, by which the buckets are firmly secured to the arms. The object of these slots is to enable the buckets to be adjusted either out or in, as circumstances may direct, by simply unscrewing the nuts $b$ of the bolts E, so as to loosen the bucket and then slide it in either direction over the bolt, the bucket when properly adjusted being again securely attached to the arms by tightening the nut $b$. The ribs B give additional strength to the attachment and prevent any lateral vibration of the buckets, and give to the latter additional strength and rigidity.

Instead of forming the slots D in the buckets, as before described, they may be formed in the flanged ends $a$ of the arms C, by which the bolts which secure the buckets to the latter may slide in them, and thus adjust the buckets in that way; but the former mode is deemed the best.

In applying the water to the wheel either one or two throats K for the purpose may be used, as may be deemed most expedient.

Having thus described my invention, what I claim as new, and desire to secure by Letters Patent, is—

The method herein described of adjusting and securing the buckets A to the arms C of the water-wheel—that is to say, the arrangement of the ribs B, mortises or their equivalents, and bolts E, in combination with the flanged end $a$ of the arms C of the wheel, substantially as set forth.

In testimony whereof I hereunto set my name in presence of two subscribing witnesses.

I. R. HOWELL.

Witnesses:
WM. H. FOWLE,
JAMES S. ROGERS.